(12) United States Patent
Richardson et al.

(10) Patent No.: US 7,633,734 B2
(45) Date of Patent: Dec. 15, 2009

(54) AC MELT TO BUSHING CURRENT DETECTOR

(75) Inventors: John P. Richardson, Canfield, OH (US); Timothy T. Owens, Wallace, MI (US)

(73) Assignee: Duca Manufacturing & Consulting, Inc., Boardman, OH (US)

( * ) Notice: Subject to any disclaimer, the term of this patent is extended or adjusted under 35 U.S.C. 154(b) by 656 days.

(21) Appl. No.: 11/591,978

(22) Filed: Nov. 2, 2006

(65) Prior Publication Data

US 2008/0106830 A1    May 8, 2008

(51) Int. Cl.
*H02H 3/08* (2006.01)
*H02H 9/02* (2006.01)
*H05B 6/16* (2006.01)

(52) U.S. Cl. .................. 361/93.1; 361/42; 373/159; 373/161; 373/162

(58) Field of Classification Search .............. None
See application file for complete search history.

(56) References Cited

U.S. PATENT DOCUMENTS

| 4,481,639 | A | * | 11/1984 | Archenholtz et al. | ........ 373/150 |
| 4,612,498 | A | * | 9/1986 | Smalley | ........ 324/503 |
| 6,208,682 | B1 | * | 3/2001 | Archenholtz et al. | ........ 373/159 |

* cited by examiner

*Primary Examiner*—Albert W Paladini
*Assistant Examiner*—Dharti H Patel

(57) ABSTRACT

An AC melt to bushing current detector (FIG. 4) for a channel induction furnace (FIG. 1) which can detect when molten metal from the loop (122) in a saturated inductor (FIG. 5) has come in contact with the metal bushing (236) whereupon the power to the induction coil (234) is turned off, preventing a catastrophic molten metal run out through the bushing (236).

9 Claims, 5 Drawing Sheets

AC MELT TO BUSHING CURRENT DETECTOR

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Technical Field of Invention

This invention relates generally to a core-type or channel induction furnace, and more particularly, to such an apparatus equipped with an AC melt to bushing current detector for monitoring and indicating AC current from the bushing to ground for the purpose of determining if there is adequate and proper electrical isolation between the molten metal in the loop and the bushing.

2. Discussion of Related Art

Channel induction furnaces for melting, holding and pouring are common place in the foundry industry. Such devices are equipped with an inductor which heats the molten metal in the furnace by inductive means. The inductor may be of either a single or multi loop design. An inductor is essentially a transformer where the primary coil is located about a magnetic core which is surrounded by a secondary winding which consists of a short circuited molten metal loop. The molten metal in the loop is contained within a refractory lining that is confined by the bushing or cooling jacket and the inductor case, where an electrically insulated, metallic, often water cooled bushing is standard equipment.

As the molten metal in the loop is inductively heated, it gains temperature. Since the greatest amount of energy is induced on the inside of the loop with the energy falling off exponentially with radial outward depth, the hottest metal is on the inside of the loop. This poses a problem since the refractory has a porosity of 15-25%. This means that the refractory grains are surrounded by interconnected pores.

Molten metal from the loop flows into the interconnected pores in the refractory forming a saturation network. The depth to which the molten metal saturation takes place is determined by the thermal gradient in the refractory lining. At the point where the heat flow from the molten metal in the loop equals the heat being extracted by the bushing, the leading edge of the molten metal saturation network will solidify. This saturation process takes place within the first week of operation. For example, the metal saturation network in a 6 inch thick lining will solidify at about 2 inches from the bushing. This depth is considered a safe distance from the bushing.

Unfortunately, as the refractory lining between the loop and the bushing wears, the thermal gradient changes allowing the leading edge of the saturation network to move closer to the bushing. Consequently, at some point in time, the saturation network will come in contact with the bushing. When it does, the saturation network will melt a hole in the bushing allowing molten metal to run out through the bushing.

A molten metal run out through the bushing is defined as molten metal breaching it's containment by the refractory and bushing, allowing the head pressure of the bath in the upper case to force molten metal out through said breach. When a molten metal run out occurs, the result can be catastrophic with potential injury to personnel and/or major equipment destruction.

3. Disadvantages Prior Art

U.S. Pat. No. 6,208,682 to Archenholta et al. (March 2001) recognizes that a channel inductor is normally equipped with a cooling jacket (bushing) for cooling of both the housing and the coil, however fails to recognize other technical and practical aspects of the cooling jacket and chooses to eliminate same. Eliminating the bushing also eliminates the most effective means for forming the required refractory lining as well as the most effective means for setting up the required thermal gradient for shutting down the process of metal penetrating radially inward, too deeply into the refractory. Prior art makes use of various, expensive, consumable, difficult to install walls of metallic net or mesh backed with an electrically insulating material installed in the refractory. Electrically insulating materials tend to have some thermal insulating properties. Placing any kind of thermal insulating material in the refractory between the bushing and the molten metal loop will alter the thermal gradient and promote a greater depth of molten metal saturation into the refractory which is not desired. A requirement of the prior art detection means comprises a measurement means for monitoring the resistance in the refractory lining between the first and the second detection walls which requires an additional power source to generate the means of detection. Typically, no means of detecting and alerting for metal penetration and potential bushing run out is used, as the only known methods have been complicated, somewhat radical in concept, difficult to install, and expensive to constantly replace consumables with each campaign.

OBJECTS AND ADVANTAGES

What is needed is a device to detect when the molten metal saturation network initially comes in contact with the bushing. By then turning off the power at this instant, a molten metal run out through the bushing should be prevented. It was not until the joint inventors discussed the problem and ran tests, that they discovered a means to identify whether the inductor is okay to continue operating or should be shut down as molten metal has contacted the bushing. Thus an object of the present invention is to provide such a detection system.

SUMMARY OF THE INVENTION AND ADVANTAGES

In accordance with the present invention, an AC melt to bushing current detector is used to monitor alternating current from the bushing to ground. This is accomplished by connecting a wire to the bushing, directing that wire to an AC melt to bushing current detector and then connecting that wire to ground. As the electrical insulation of the refractory, which contains the molten metal, is reduced by any means such as thinning due to wear, saturation with conductive metals, or increased moisture content, alternating current will leak from the energized molten bath to the grounded bushing at an increased rate.

In the preferred embodiment, it is possible to monitor the condition of the refractory containment of the molten metal in the loop by means of the alternating current flowing from the bushing to ground. The current level that results when the molten metal in the saturation network initially makes contact with the bushing becomes the control point where the power to the inductor is turned off.

The preferred embodiment of the present invention utilizes the inherently induced alternating current in a channel furnace loop to supply the power for the alternating current signal to the grounded bushing; therefore no external power source is required to generate the primary signal which is monitored.

The preferred embodiment of the present invention makes use of the typical, isolated, metallic bushing of a channel furnace inductor as the grounded point of reference, therefore no consumable screen(s), wall(s), mesh netting, graphite layer(s), special materials or insulation layers need to be installed in the refractory between the inherent bushing and molten metal loop of a channel furnace inductor.

The preferred embodiment of the present invention utilizes a means to disconnect the flow of alternating current from the bushing to ground once it reaches no more than 15 amperes.

The preferred embodiment of the present invention is cost effective as the system is used over and over with each inductor campaign, in its installed form. The present invention is simple to disconnect from a spent inductor and reconnect to a fresh inductor as only one wire must be detached from the inductor bushing and then reattached to the bushing of the replacement inductor. A cooling bushing is not a consumable item as it is standard equipment used in a channel furnace inductor for a multiplicity of campaigns.

Use of the present invention results in the minimization or prevention of molten metal run outs through the bushing.

DRAWINGS—FIGURES

Still other advantages of the present invention will become apparent to those skilled in the art after reading the following specification and by reference to the drawings which:

DRAWINGS—REFERENCE NUMERALS

Figure 1:
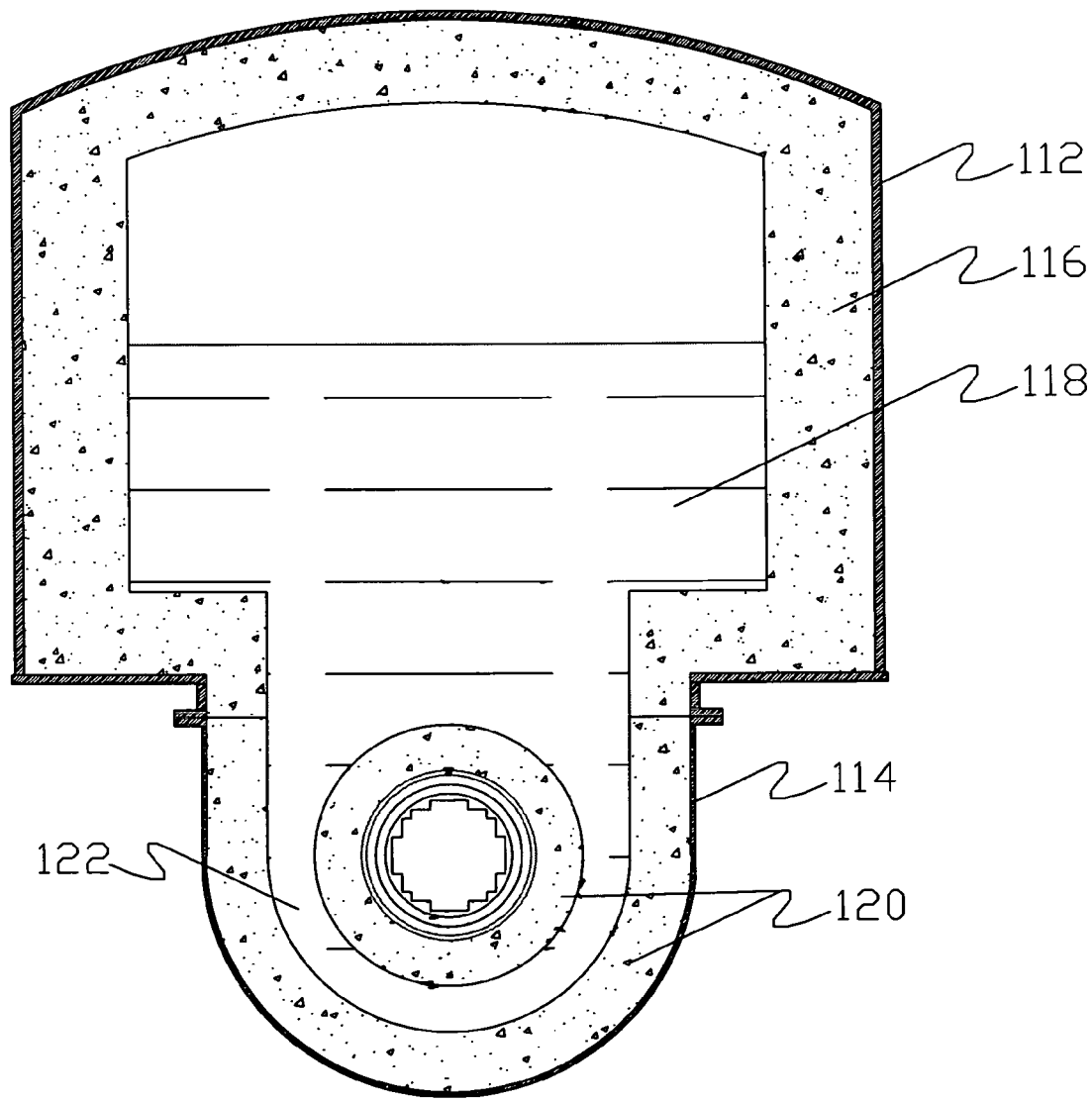
FIG. 1 is a cross section view of a channel induction furnace comprised of an upper case and a lower case which is otherwise known as an inductor.
Figure 2:
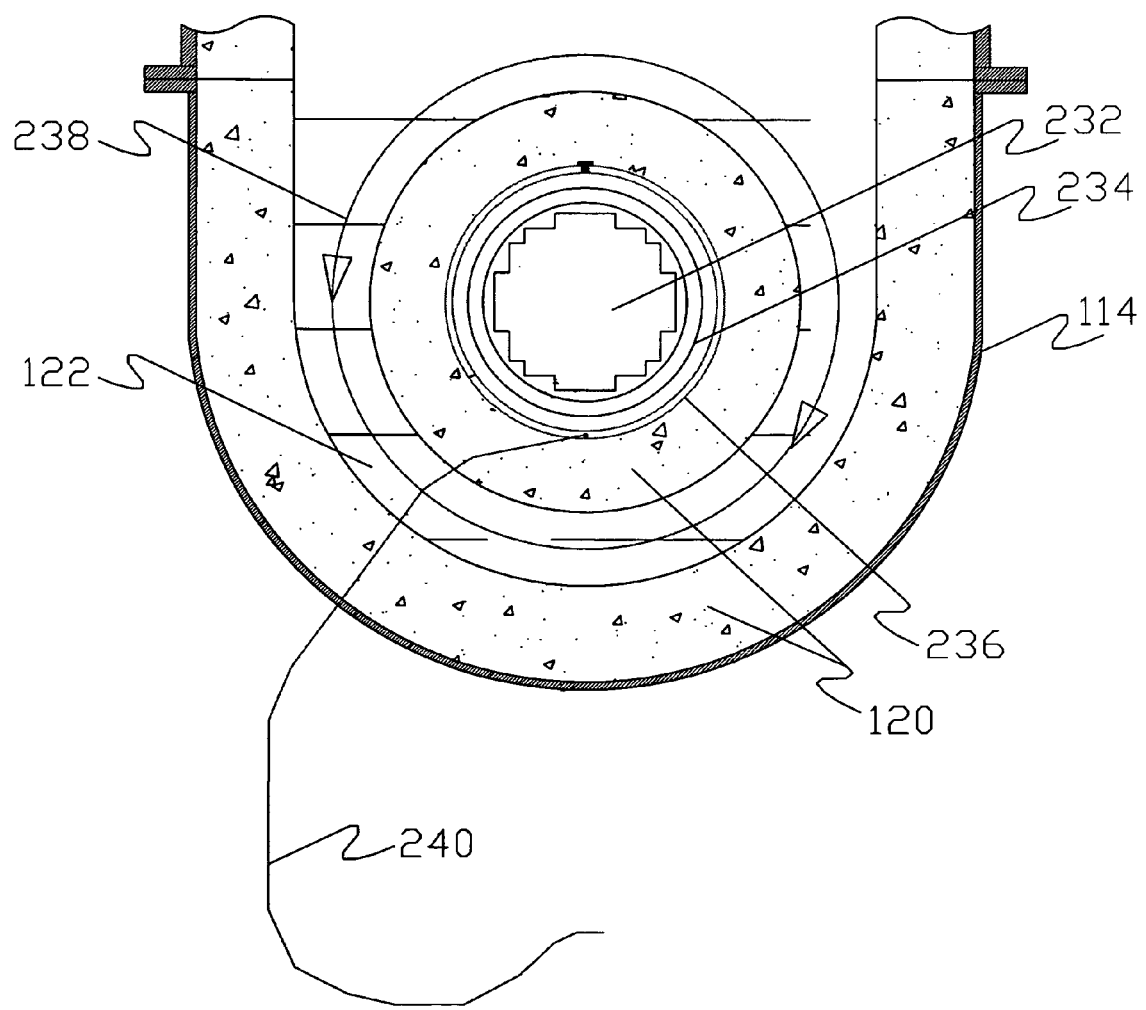
FIG. 2 is a cross section view of a channel furnace inductor which is comprised of a case, a core, a coil and a bushing with a ground wire attached to the 6:00 position on the bushing.

| | FIG. 1 typical channel induction furnace |
|---|---|
| 112 | steel upper case |
| 114 | steel lower case |
| 116 | upper case refractory |
| 118 | molten metal bath |
| 120 | lower case refractory lining |
| 122 | molten metal loop |
| | FIG. 2 typical channel inductor cross section |
| 232 | magnetic core |
| 234 | induction coil |
| 236 | metal bushing |

Figure 3:
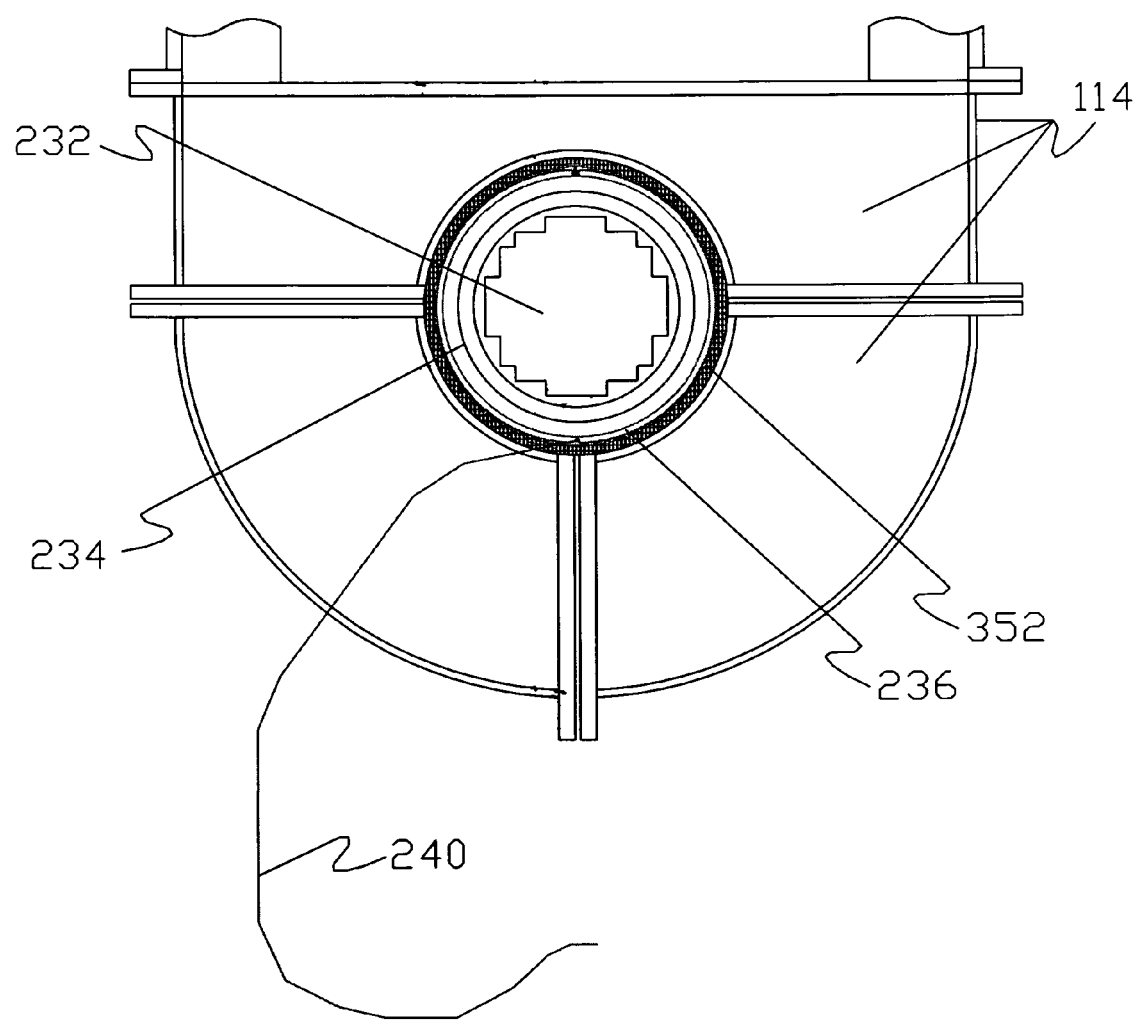
FIG. 3 is a cross section view of a channel furnace inductor core and a side view of the case, coil and a bushing, which is electrically insulated from the case and has a ground wire attached to its 6:00 position.
Figure 4:
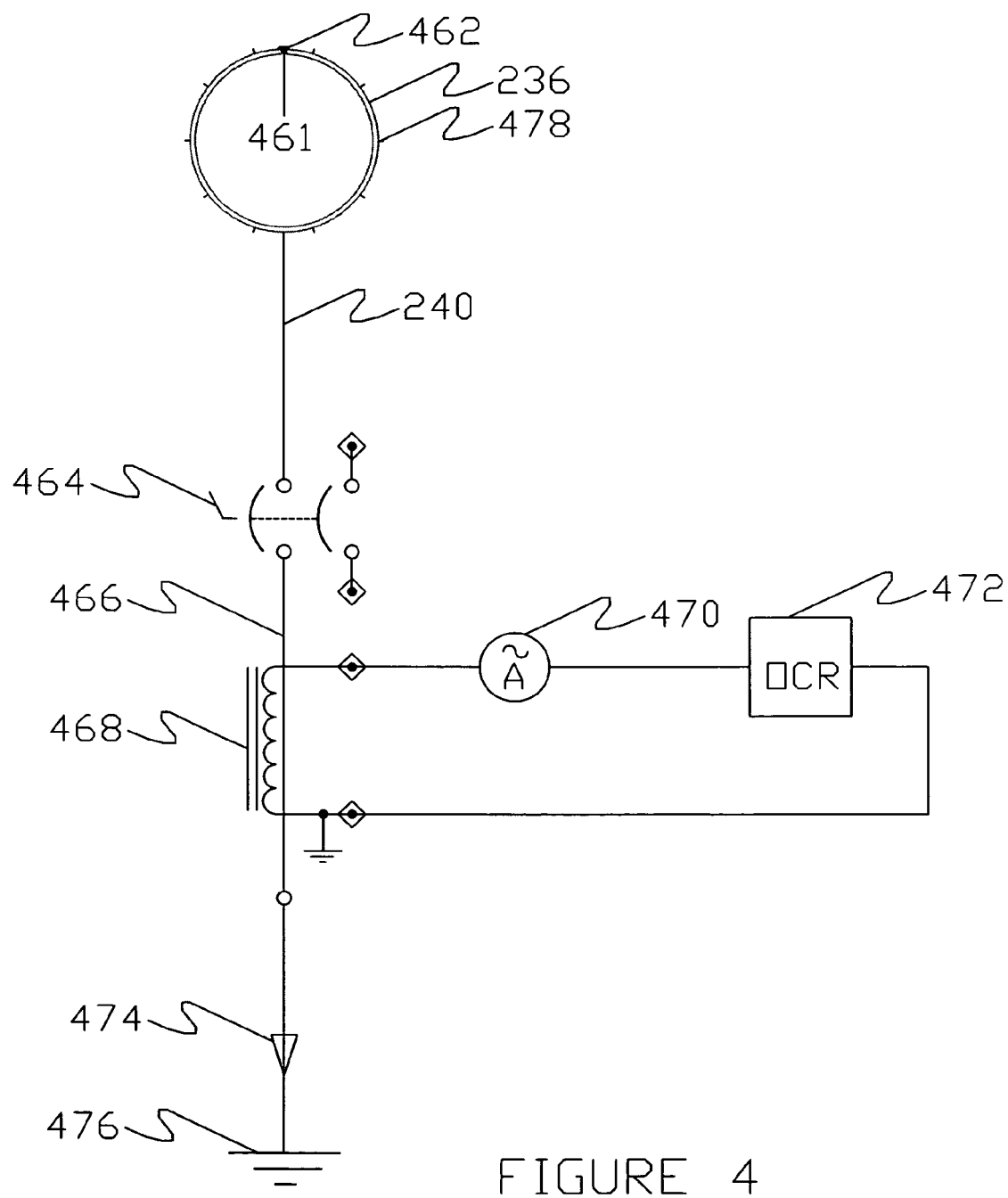
FIG. 4 is an electrical schematic of the AC melt to bushing current detector circuit comprised of the necessary electrical components to detect and monitor the alternating current from the bushing to ground.
Figure 5:
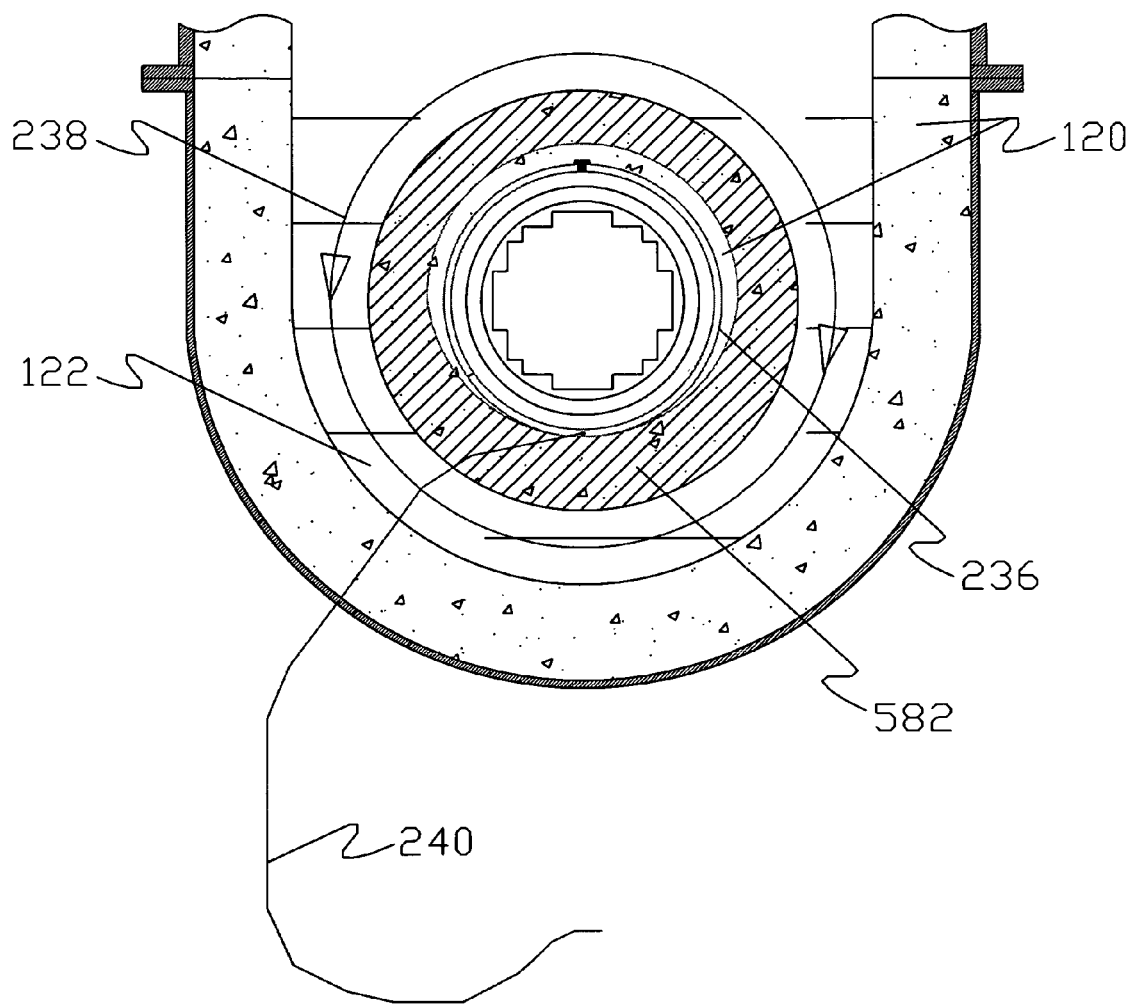
FIG. 5 is a cross section view of a channel furnace inductor after the refractory lining between the molten metal loop and the bushing has been saturated with molten iron.

| | -continued |
|---|---|
| 238 | alternating current in loop |
| 240 | conductor wire |
| | FIG. 3 typical channel inductor side view |
| 352 | insulation between bushing and case |
| | FIG. 4 AC melt to bushing current detector |
| 461 | bushing joint gap |
| 462 | bushing joint insulation |
| 464 | circuit breaker |
| 466 | conductor wire |
| 468 | current transformer |
| 470 | AC ammeter |
| 472 | over current relay |
| 474 | alternating current to ground |
| 476 | ground |
| 478 | metallic detection pegs |
| | FIG. 5 saturated inductor cross section |
| 582 | metal saturated refractory network |

DETAILED DESCRIPTION OF THE PREFERRED EMBODIMENT

The following description of the preferred embodiment is merely exemplary in nature and is not intended to limit the invention, its application or uses.

In FIG. 1 there is shown a typical channel induction furnace, which consists of an upper case or hearth 112 and a steel lower case 114. The upper case 112 is fitted with a refractory lining 116 which contains the upper case 112 molten metal or bath 118. The lower-case 114 is fitted with a refractory lining 120 which contains the molten metal in the channel or loop 122.

In FIG. 2 there is shown a typical channel furnace inductor cross section, which consists of a steel lower case 114, a magnetic core 232, a primary electrical coil 234, a bushing or cooling jacket 236, a refractory lining 120 and a molten metal loop 122. Also shown is a depiction of the alternating current 238 which is present in the molten metal loop 122 when induction power is enabled.

When the coil 234 is energized, it establishes a magnetic flux in the core 232. This flux also induces a voltage in the molten metal loop 122. Since the molten metal loop 122 is a short circuited secondary winding, an alternating current 238 exists in the molten metal loop 122. The square of this alternating current 238 times the resistance of the current path in the molten metal loop 122 superheats the molten metal in the loop 122.

Since the molten metal 118 in the upper case 112 and the molten metal in the loop 122 are intentionally ungrounded, the induced voltage causes the molten metal 118 in the upper case 112 and in the loop 122 to have a potential above ground reaching 50 volts in a 4500 kilowatt inductor. In the preferred embodiment, it is this voltage that is used to power the primary circuit of the AC melt to bushing current detector.

In FIG. 3 there is shown a typical channel furnace inductor side view, which consists of a steel case 114, a magnetic core 232, a primary electrical coil 234, a bushing 236 with conductor wire 240 attached. The bushing 236 is electrically insulated from the steel case 114 by insulation 352 which is typically ceramic rope or glass and mica material.

In FIG. 4 there is shown the electrical circuit for the preferred embodiment of the AC melt to bushing current detector. A conductor wire 240 is attached to the bushing 236 at 180 degrees from the bushing joint gap 461 which contains the bushing joint insulation 462. From the bushing 236, conductor wire 240 is first connected to a circuit breaker 464. The purpose of the circuit breaker 464 is to trip and turn off the electrical power source of the inductor FIG. 2 and to disconnect the bushing 236 from ground 476 when alternating current 474 to ground 476 exceeds 15 amperes as a dead short will produce a current upwards of 360 amperes in the conductor wires 240 and 466 when they are connected to ground 476.

The magnitude of the current 474 at any point in time can be measured by directing conductor wire 466 through a current transformer 468 before connecting conductor wire 466 to ground 476. The current transformer 468 is connected to an AC ammeter 470 which indicates the magnitude of the alternating current 474 flowing to ground 476. An over current relay 472 is employed to monitor the magnitude of the alternating current 474 to ground 476 and to turn off the power to the inductor FIG. 2 when the alternating current 474 to ground 476 exceeds its set point.

When the inductor FIG. 2 is fitted with a new lower case refractory lining 120, moisture may exists in the new lower case refractory lining 120 which lowers the resistance through the lower case refractory lining 120. The voltage induced in the molten metal loop 122 will cause an alternating current 474 to flow from the molten metal loop 122 to the bushing 236 that is connected to ground 476. Once the new lower case refractory lining 120 dries, the resistance through the lower case refractory lining 120 increases and the alternating current 474 from the molten metal loop 122 to the grounded bushing 236 drops to below 1 ampere and as low as 0 amperes. Thus, the first feature of the AC melt to bushing current detector FIG. 4 is that it can provide information on the drying out of the refractory lining 120 in the inductor FIG. 2. The preferred embodiment of this feature of the AC melt to bushing current detector FIG. 4 utilizes the bushing 236 with no coating of any paint or insulation on the outer surface of the bushing 236 which is adjacent to the refractory lining 120 and molten metal loop 122.

FIG. 5 shows the cross section of a metal saturated channel inductor with the molten metal saturation network 582 that forms as the molten metal loop 122 penetrates into the refractory lining 120. Eventually, that saturation network 582 will come in contact with the bushing 236. Thus, a second feature of the AC melt to bushing current detector FIG. 4 is that it can detect when the saturation network 582 initially contacts the bushing 236 and respond by turning off the power source of the saturated channel inductor FIG. 5.

The instant that molten metal in the saturation network 582 comes in contact with the bushing 236, the alternating current 474 from the bushing 236 to ground 476 increases rapidly. When the magnitude of the alternating current 474 to ground 476 reaches the set point of 10 amperes, the alternating current 238 in the molten metal loop 122 of the inductor FIG. 2, 3 or 5 is turned off by the over current relay 472 and a melt to bushing fault is identified and indicated. When the magnitude of the alternating current 474 to ground 476 exceeds 15 amperes, the circuit breaker 468 will trip and likewise turn off the power source for the alternating current 238 in the molten metal loop 122. Once the alternating current 238 in the molten metal loop 122 is turned off, the bushing 236 will then cool and solidify the molten metal saturation network 582 allowing time to empty the furnace FIG. 1 without encountering a molten metal run out through the bushing 236.

Since the AC melt to bushing current detector FIG. 4 is based on the need for the molten metal in the saturation network 582 to contact the bushing 236, small diameter metallic pegs 478 can be attached to the bushing 236 so that they protrude radially outward from the bushing 236 and into the lower case refractory lining 120 as shown in FIG. 4. When the peg 478 is one half of an inch long, the AC melt to bushing current detector FIG. 4 will shut down the furnace FIG. 1 by removing the alternating current 238 in the molten metal loop 122 when the saturation network 582 is at a more safe distance from the bushing 236 as defined by the chosen length of the metal pegs 478.

Conclusion

The foregoing discussions, disclosures describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. An AC melt to bushing current detector to monitor and measure the ground current between the molten metal in the loop and the bushing, said AC melt to bushing current detector for a single loop inductor comprising:
   a conductor wire connected from the bushing, which is isolated from the inductor case, to ground;
   a circuit breaker to disconnect the ground conductor wire when the alternating current to ground exceeds a safe level;
   a current transformer to ratio the actual current to ground to a metered current level;
   an ammeter is used to indicate the magnitude of the current to ground; and
   an over current relay to monitor the current and turn off the inductor power when the alternating current to ground exceeds a set point and to indicate that a melt to bushing fault has occurred.

2. A melt to bushing current detector of claim 1 wherein the AC melt to bushing current detector components are doubled to accommodate the two bushings used in a twin loop inductor.

3. A melt to bushing detector of claims 1 or 2 which utilizes the inherently induced alternating voltage in a channel furnace loop to power the alternating current signal to the grounded bushing, where no external power source is required to generate the primary signal which is monitored.

4. A melt to bushing detector of claims 1 or 2 where the outer surface metal of the bushing has been left bare or free from any insulation coating where it is adjacent to the molten metal loop.

5. A melt to bushing detector of claims 1 or 2 which provides levels of alternating current proportional to moisture content within the refractory of an inductor for indicating the moisture level.

6. A melt to bushing detector of claims 1 or 2 which utilizes a means to disconnect the flow of alternating current to ground from the inherent inductor bushing of a channel furnace inductor.

7. A melt to bushing current detector of claims 1 or 2 where the bushing has been fitted with metallic pegs that protrude from the bushing toward the center line of the loop.

8. A melt to bushing detector of claims 1 or 2 which provides indication when the bushing loses its isolation from and comes in contact with the inductor case or core.

9. A melt to bushing detector of claims 1 or 2 which connects to the bushing of an inductor and does not require the addition of any consumable screen(s), wall(s), mesh netting, graphite layer(s), special materials or insulation layers installed in the refractory or between the inherent inductor bushing and molten metal loop of a channel furnace inductor.

* * * * *